June 9, 1953  R. L. PHERSON  2,641,370
LOADING DEVICE FOR DUMP TRUCKS AND THE LIKE
Filed Aug. 11, 1948  7 Sheets-Sheet 2

Fig. 2

INVENTOR.
RAYMOND L. PHERSON
BY
Lamphere and Van Valkenburgh
ATTORNEYS

June 9, 1953  R. L. PHERSON  2,641,370
LOADING DEVICE FOR DUMP TRUCKS AND THE LIKE
Filed Aug. 11, 1948  7 Sheets-Sheet 3

INVENTOR.
RAYMOND L. PHERSON
BY
Lamphere and Van Valkenburgh
ATTORNEYS

June 9, 1953 R. L. PHERSON 2,641,370
LOADING DEVICE FOR DUMP TRUCKS AND THE LIKE
Filed Aug. 11, 1948 7 Sheets-Sheet 4

INVENTOR.
RAYMOND L. PHERSON
BY
Lanphere and Van Valkenburgh
ATTORNEYS

June 9, 1953            R. L. PHERSON            2,641,370

LOADING DEVICE FOR DUMP TRUCKS AND THE LIKE

Filed Aug. 11, 1948            7 Sheets-Sheet 6

INVENTOR.
RAYMOND L. PHERSON

BY Lamphere and Van Valkenburgh

ATTORNEYS

Patented June 9, 1953

2,641,370

UNITED STATES PATENT OFFICE 2,641,370

LOADING DEVICE FOR DUMP TRUCKS AND THE LIKE

Raymond L. Pherson, Boulder, Colo.

Application August 11, 1948, Serial No. 43,673

19 Claims. (Cl. 214—78)

This invention relates to loading devices, and more particularly to loading devices adapted to be removably installed on the rear of a dump truck or the like, for loading dirt, gravel, sand, ore or other material into the truck body.

Among the objects of this invention are to provide a novel loader which may be attached to the rear end of a dump truck or the like; to provide such a loader which may be driven by a power takeoff from the truck; to provide such a loader which will pick up material disposed at the rear of the truck and deposit it in the body or box mounted on the truck; to provide such a loader which is readily attached to and detached from the truck; to provide such a loader which will pick up material at an extended distance to the rear of the truck, as well as closer to the truck, so that the position of the truck need be changed infrequently, if at all, before a substantially full load is deposited on the truck; to provide such a loader which is adapted to dig down into, as well as to push or crowd in a generally horizontal direction into a pile of dirt, sand, gravel, ore or other material to be loaded into the truck; to provide such a loader which may take one of several forms; to provide one form of such loader which is operated primarily by cables and pulleys, and another form which is operated hydraulically; to provide relatively simple controls for such a loader, so that only one operator, such as a truck driver, is necessary; to provide such controls which are operable from a convenient point, at which a clear view of the loading operation is obtained; to provide such a loader which is sufficiently sturdy in construction to withstand the rigors of hard usage and abuse; and to provide such a loader which is relatively easy to operate, requires a minimum of adjustment, and is highly satisfactory in service.

Other objects and the novel features of this invention will become apparent from the description which follows, taken in connection with the accompanying drawings, in which.

Figure 1:
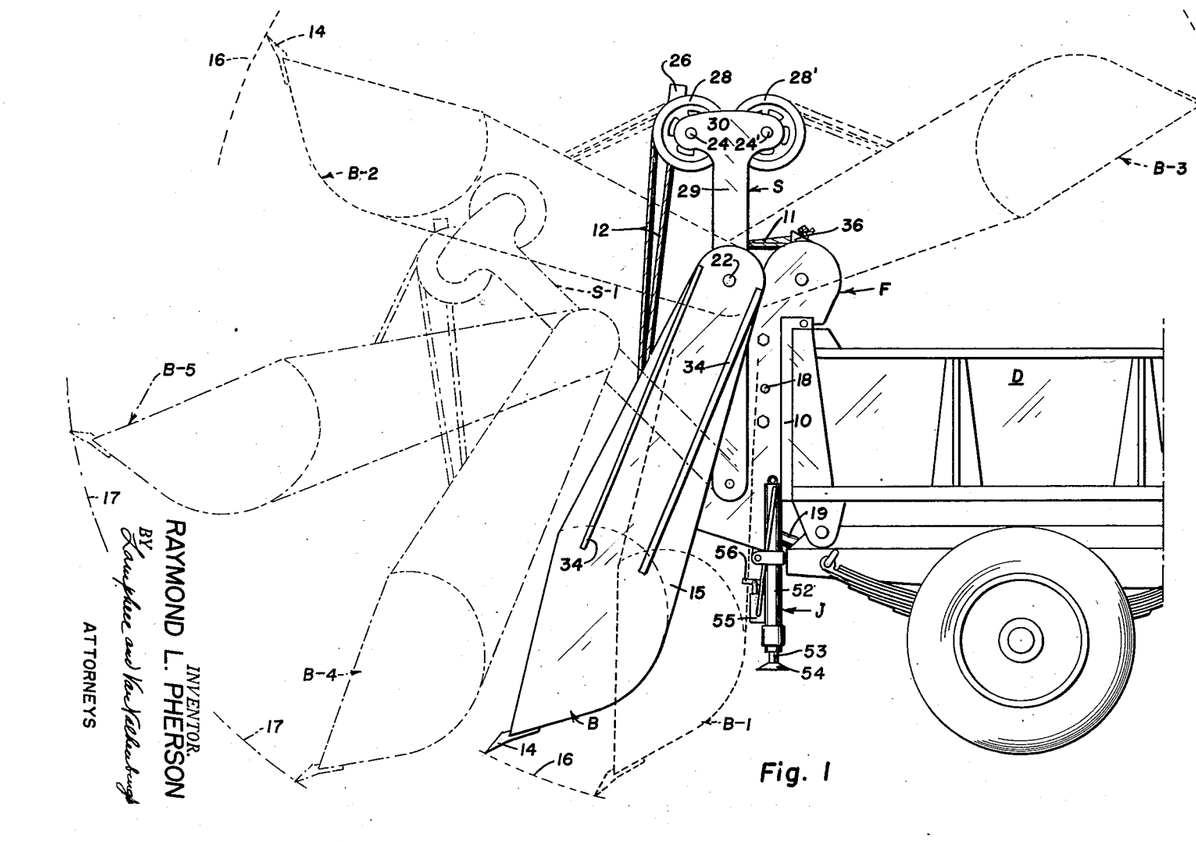
Fig. 1 is a side elevation of a loader, comprising one embodiment of this invention, operated primarily by cables and pulleys, installed on the rear of a dump truck body, and showing a number of positions illustrative of loading operations.
Figure 2:
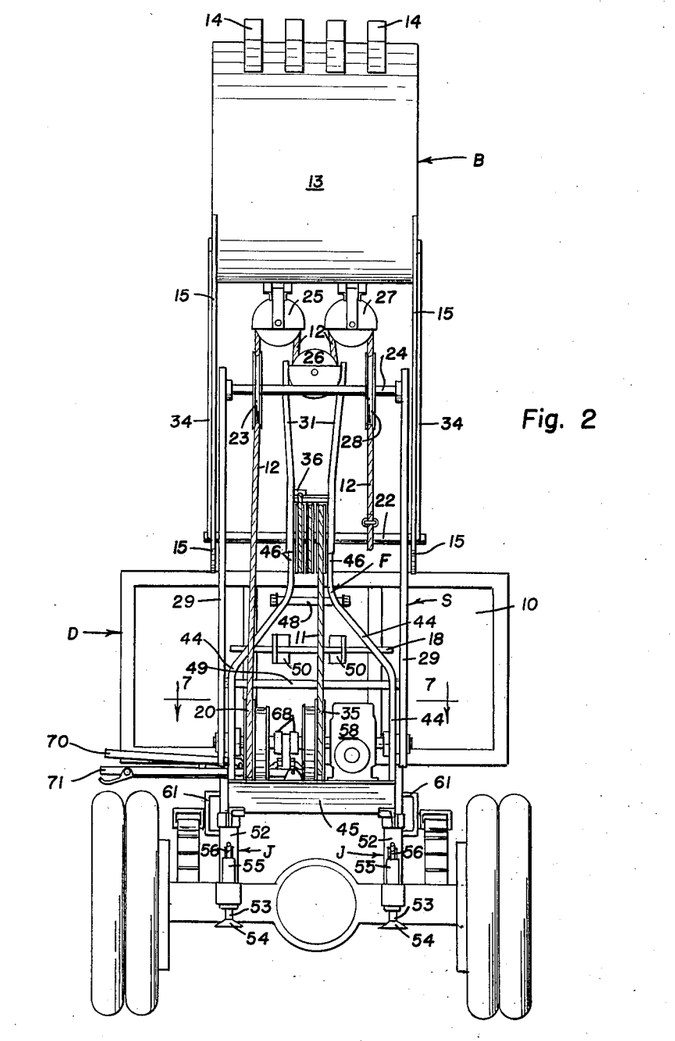
Fig. 2 is a rear view of the loader and truck of Fig. 1, with the loader in full upright position.
Figure 3:
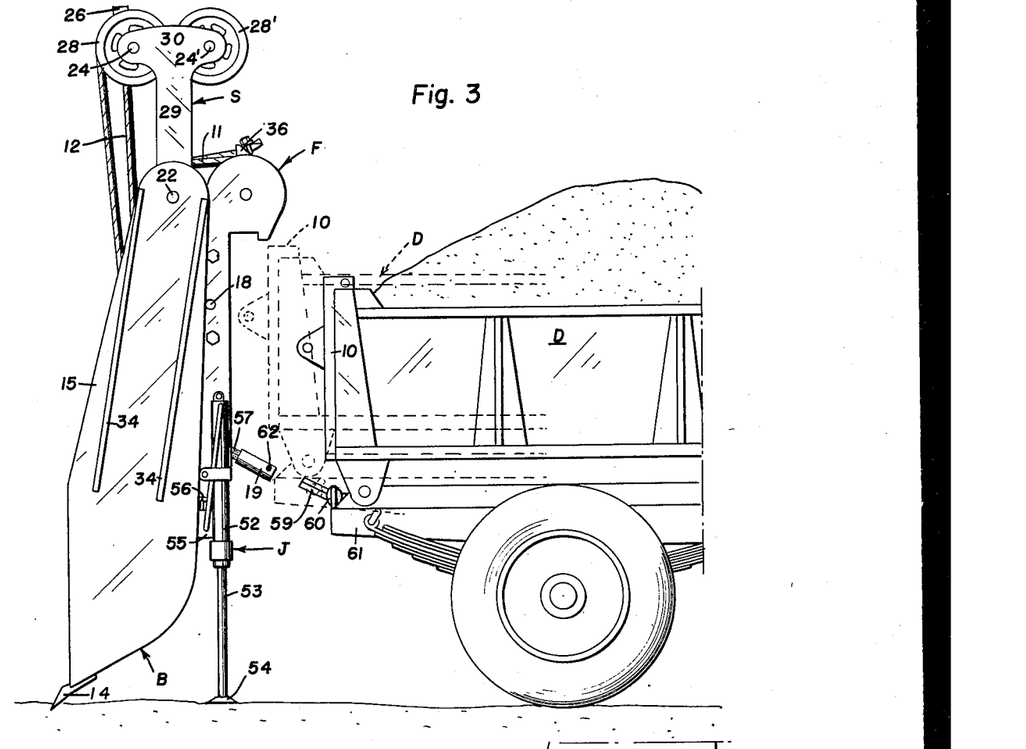
Fig. 3 is a side view of the loader, after detachment from a loaded truck, in position for standing until the same or another unloaded truck is moved into position for attachment of the loader thereto.
Figures 4, 5, 6, 9, 10:
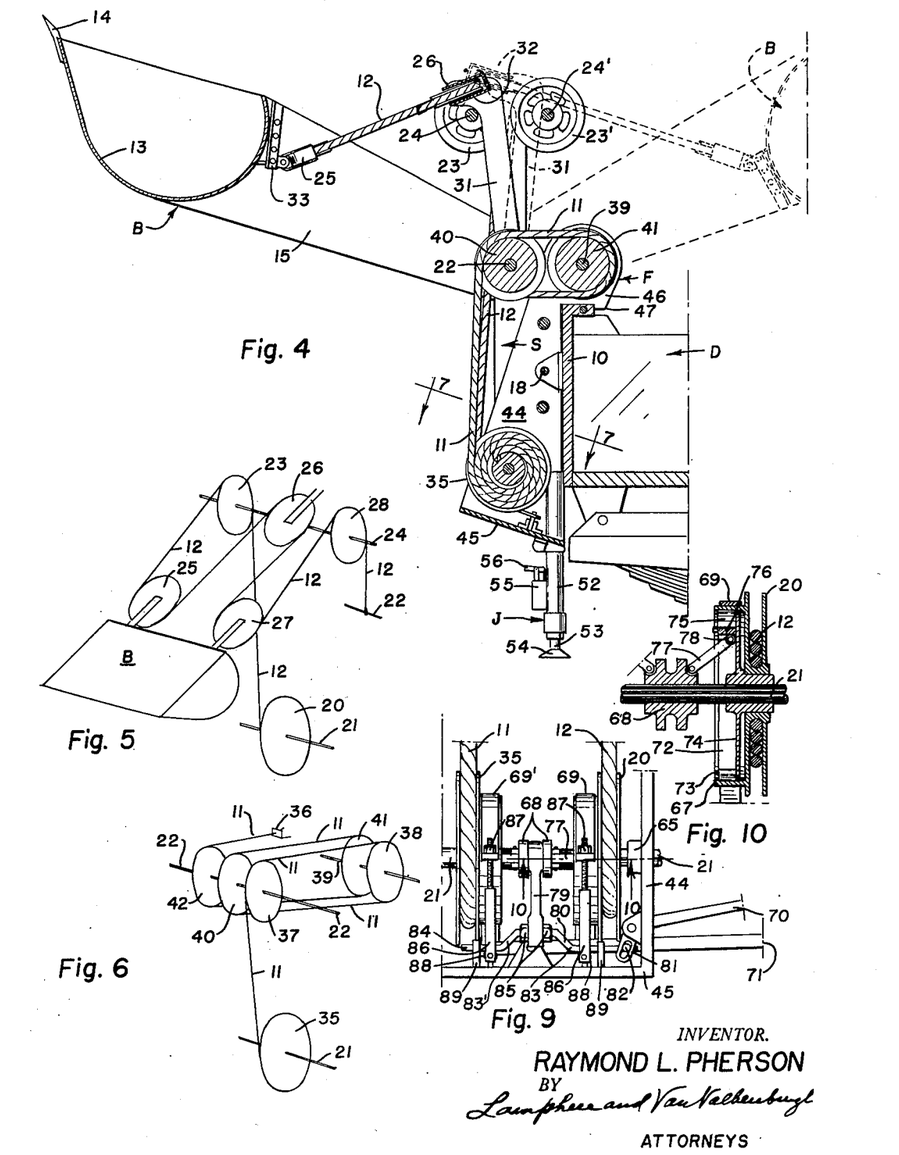
Fig. 4 is a central vertical section of the loader, attached to the truck body.
Fig. 5 is a cable diagram for the bucket of the loader.
Fig. 6 is a cable diagram for the boom of the loader.
Fig. 9 is a fragmentary elevation, looking rearwardly along line 9—9 of Fig. 7, showing a portion of the drive mechanism.
Fig. 10 is a fragmentary transverse section, taken along line 10—10 of Fig. 9.

A truck loader constructed in accordance with this invention, and comprising one embodiment thereof, which is operated essentially by a system of cables and pulleys, is illustrated in Figs. 1–10. As in Fig. 1, the loader is adapted to be mounted on the tail gate 10 of the dump body D of a truck, and to be operated to fill the dump body D with dirt, sand, gravel, ore or other material disposed rearwardly of the truck. The loader is also adapted to be readily detached from the truck, after having been placed in a standing position, as in Fig. 3. Such embodiment of this invention, as in Fig. 1, includes a stationary support or frame F, removably attached to the tail gate 10; a pivotal support of boom S, pivoted at its lower end on the frame F and adapted to be moved to a desired position by a cable 11, or by gravity; and a bucket or scoop B pivoted at its upper end on boom S and moved to desired positions by a cable 12, or by gravity. The bucket B may include a curved scoop plate 13 which, as in Figs. 1, 2 and 4, is desirably provided with digging teeth 14 along the front edge, the front end of the scoop plate 13 preferably being straight, the central portion being arcuate and the rear end preferably having a slight reverse curvature, so that material will tend to slide forwardly into the dump body D when the bucket B is in the upright position of Fig. 2 or in the dotted position B-3 of Fig. 1 above the dump body D. The scoop plate 13 is mounted at the lower end of and between a pair of parallel arms or plates 15, the lower ends of which form side walls for the bucket.

The boom S is movable from the upper vertical or full position of Fig. 1, to a lower dotted position S-1, to an even lower position, or to intermediate positions. The bucket B is movable about its pivot point, generally through an arc for each position of the boom S, it being understood that the boom and bucket may be moved simultaneously, to produce an approximately straight line or other desired motion. Thus, when the boom S is in the solid position of Fig. 1, the bucket B may be moved to various positions along dotted arc 16, such as being dropped to a lower dotted position B-1 from full position B, moved upwardly to rear dotted position B-2, or over to front dotted position B-3, for unloading. When the boom S is in the dot-dash position S-1, the bucket B may be moved to various positions along dot-dash arc 17, such as to a lower dot-dash position B-4 or an upper dot-dash position B-5. The movement of the bucket required is only that necessary to load material into the bucket. As will be evident, the bucket may be extended a considerable distance to the rear of the truck, particularly when the boom is in a lower position, and may also be used in digging down beneath the level of the ground on which the truck is standing. As will be evident, the bucket may "crowd" into the material to be loaded, as by simultaneously lowering the boom S and pivoting the bucket B thereon, as for example to move the bucket from position B or B-1 to position B-4. Such "crowding" may be produced at substantially any level, as rearwardly from position B-5.

While it is sometimes necessary to push the bucket into the pile of material more than once, as soon as the bucket is full, it is raised to an upper position, such as B-5, whereupon the boom may be pulled up to the full position, and the bucket then swung about the upper portion of arc 16, to cause the material to be deposited in the truck body. By stopping the bucket in an almost upright position, such as that shown in Fig. 2, the material will fall into the rear end of the truck body; or by moving the bucket up and over with greater speed, the material may be thrown clear to the cab. Normally, the bucket, when moved over onto the dump body D at a normal speed, will deposit the material in about the center of the dump body.

After the truck has been loaded, the bucket may be moved over on top of the pile of material in the dump body, and the loader carried with the truck. Or, if the driver is coming back for another load at the same spot, or the haul is relatively long, the loader may be detached from the truck very quickly, merely by letting the end of the bucket come to rest on the ground, as in the position of Fig. 3, and taking the weight of the loader off the tail gate by extending hydraulic jacks J. Then, a locking pin 18 (see also Fig. 2) is pulled, a drive shaft coupling 19 disconnected, and frame F elevated by hydraulic jacks J, after which the truck may be driven away from the loader. When there is a full load in the dump body D, the frame F is preferably jacked up a sufficient distance, such as five or six inches, so that when the truck returns, the elevation of the frame F will correspond to the elevation of the tail gate 10, as indicated by the dotted position thereof of Fig. 3. This difference in elevation is due to the weight of the load in the truck which depresses the springs, the truck body thereby assuming a higher position when empty than when loaded.

If desired, the loader may remain on the truck, and the load dumped by elevating the forward end of the dump body by the conventional equipment. However, since the attachment and removal of the loading device of this invention to the truck body is relatively simple and may require only a few seconds of time, it is normally simpler merely to remove the loading device prior to dumping the load.

The cable and pulley systems for operating the bucket B and boom S are illustrated diagrammatically in Figs. 5 and 6, respectively. As in Fig. 5, the cable 12 for the bucket B is wound at one end around a drum 20, mounted for rotation on a shaft 21, the opposite end of the cable being attached to a fixed rod or shaft 22, on which bucket arms 15 are pivoted. From the drum 20, the cable 12 passes over a guide pulley 23, mounted on a shaft 24 which is carried by boom S, and then around a sheave 25 which is mounted on the bucket B. Thence, cable 12 passes around a central pivoting sheave 26, back to a second sheave 27 mounted on the bucket, and thence around a guide pulley 28 to its point of attachment to fixed rod 22. As will be evident from Figs. 2, 4 and 5, when the cable 12 is wound on the drum 20, the bucket B will be pulled toward the boom S, since the shaft 24 for guide pulleys 23 and 28 is mounted at the upper end of the boom S, extending between a pair of arms or plates 29, each having an enlarged upper end or head 30 to accommodate shaft 24 and a second shaft 24', parallel thereto, on which is mounted alternative guide pulleys 23' and 28'. As will be evident from Fig. 1, when the bucket B is in a pivotal position to the rear of the boom S, the bucket cable 12 will pass over the guide pulleys 23 and 28, but when the bucket is in a position forward of the boom S, such as position B-3 of Fig. 1, the bucket cable 12 will pass over guide pulleys 23' and 28'. Also, when the bucket B is moved from a rear position to a forward position, such as through the upright position of Fig. 2, the bucket cable 12 will at that time be passing from guide pulleys 23 and 28 to guide pulleys 23' and 28'.

As the bucket B passes through this upper position, the central pivoting sheave 26 will also be shifting in position, as indicated more clearly in Fig. 4. The central pivoting sheave 26 is not only mounted for rotation about its own shaft, as cable 12 passes thereover, but also for pivotal movement about a horizontal axis, and for movement between rear and front positions, about shaft 22 as an axis. Thus, sheave 26 is pivotally mounted between a pair of arms or plates 31, in turn pivotally mounted at their lower ends on fixed rod or shaft 22, each plate 31 being provided at its upper end with a rearwardly extending nose 32, which provides additional clearance for cable 12 over shaft 24, when bucket B is in the lower, rear position. As bucket B is pulled upwardly, as from the full position of Fig. 4, sheave 26 will turn until it reaches the vertical position of Fig. 2, when the cable 12 passing through pivoting sheave 26 is directly in alignment with fixed rod or shaft 22. As the bucket swings through dead center, at the top of its arc of movement, sheave 26 will swing with it, since the arms 31 for pivoting pulley 26 will swing from the full to the dotted position of Fig. 4, the extent of the movement of the arms 31 being determined by abutment of the same against the shafts 24 and 24', respectively. By releasing the cable 12, as by releasing a brake for drum 20 (in a manner described later), the bucket will begin to move forwardly and downwardly by its own weight toward the dump body D, such as to the dotted position of Fig. 4. After the bucket has dumped its load into the dump body of the truck, drum 20 may be again rotated to cause cable 12 to be drawn onto the drum, thereby pulling the bucket back up to the center position, at which time the bucket will tend to swing back across dead center, the pivoting pulley 26 and its supporting arms 31 moving from the dotted to the full position of Fig. 4 at the same time, so that when the pivoting pulley has swung back to the full position, the bucket will have moved past dead center and can then be lowered by releasing the brake drum 20. As will be evident, the pivotal movement of the supporting arms 31 from the full to the dotted position of Fig. 4, and vice versa, is of considerable advantage, in that the bucket does not tend to stay in a dead center position, since as soon as it starts to move past dead center in either direction, the arms 31 will immediately swing over, and the bucket will move past dead center to the opposite position. By such construction, the possibility of the bucket becoming "stuck" on dead center is substantially eliminated.

The guide pulleys 28 and 28', being adjacent the point of attachment of the end of the bucket cable 12 to rod 22, ordinarily do not rotate, and may be replaced by fixed quadrants or the like having cable receiving flanges, but it is simpler merely to install a pair of pulleys on the shafts 24 and 24'. The sheaves 25, 26 and 27 are provided with conventional housings as shown, and suitable brackets 33 are attached to the top of the scoop plate 13, as in Figs. 2 and 4, for attachment of the sheaves 25 and 27. The arms 15 for the bucket B may further be provided with suitable reinforcing bars or strips 34, as in Figs. 2 and 3.

The pulley and cable drive arrangement for the boom S is illustrated diagrammatically in Fig. 6, and includes a drum 35, also rotatable on shaft 21, on which cable 11 is adapted to be wound, the opposite end of cable 11 being secured to a stationary clip or stanchion 36, on framework F. From drum 35, cable 11 passes up over a pulley 37, mounted on shaft 22, which, as indicated previously, is mounted between the arms 29 of boom S; thence forwardly over a pulley 38 on a stationary shaft 39, which in turn is mounted in frame F; thence rearwardly around a second pulley 40 on shaft 22; thence around a second pulley 41 on shaft 39; thence around a third pulley 42 on shaft 22; and finally forwardly to stanchion 36. As will be evident from Fig. 6, when cable 11 is wound on drum 35, the shaft 22 of the boom S will be moved closer to the stationary shaft 39 on frame F, thereby raising the boom. Conversely, when the cable 11 is permitted to unwind from drum 35, the shaft 22 will move away from shaft 39, thereby permitting the boom S to be lowered by gravity.

The fixed support or frame F may include a pair of side plates 44, as in Fig. 2, spaced farther apart at their lower ends to accommodate drive mechanism mounted on a platform 45, which extends across between the lower ends of side plates 44, while the lesser width at the top provides more stable support for pulleys 38 and 41. Toward their upper ends, the side plates 44 converge, as in Fig. 2, and terminate in heads 46, between which extends stationary shaft 39. Heads 46, as in Fig. 4, overhang the tail gate 10 of the dump body D, and are also provided with lips 47 adapted to catch onto the inside of the tail gate. The side plates 44 may be connected together by reinforcing rods 48 and 49, as in Figs. 2 and 4, extending between the plates and adapted to provide a more rigid structure, reinforcing rod 48 preferably being above and reinforcing rod 49 preferably being below locking pin or rod 18, by which the framework is more securely attached to the tail gate. As in Fig. 2, a pair of angles or clips 50 may be welded or suitably attached to the tail gate 10 and the outwardly extending flanges thereof provided with suitable holes through which the locking pin 18 extends. As will be evident from Fig. 4, with the locking pin 18 in position, the framework F is held securely to the tail gate 10, since the lips 47 cannot come off the top of the tail gate.

One of the jacks J is mounted on each of the side plates 44 of frame F, each jack normally including a barrel 52, preferably mounted in vertical position on the side plate 44. Each jack also includes a piston or plunger 53, provided with a footing 54 and adapted to be extended downwardly from the barrel 52; a pump 55 for producing hydraulic pressure; and a handle 56 for operating the pump 55. In addition, each jack includes a conventional release valve (not shown) for releasing the pressure of fluid against the plunger 53 when the jack is to be released. Suitable means for locking the plunger in an upper position, such as a locking pin (not shown), may also be provided.

In attaching and disconnecting the loading device from the truck, only two connections are necessary. One connection is the locking pin or rod 18, which may readily be inserted in or pulled from the holes in side plates 44 and angles 50. The other connection is the collar or coupling 19 which, as in Figs. 3 and 7, may be internally square, so as to fit onto the square end of an input shaft 57 of a speed reducer 58 and also onto the square end of a power shaft 59. The latter may be provided with one or more universal joints 60, and extends from a conventional power takeoff at the truck transmission (not shown), rearwardly along the frame 61 of the truck, as in Fig. 3. The coupling 19 may be provided with one or more holes, and the shafts 57 and 59 with corresponding holes, so that a cotter pin 62 or the like, for locking the coupling against longitudinal movement on the shafts, may be inserted when connecting the loading device to the truck, and removed when the device is disconnected. The same pin may be used in attaching the coupling 19 to the shaft 57, to prevent loss when the device is disconnected from the truck.

Figure 7:
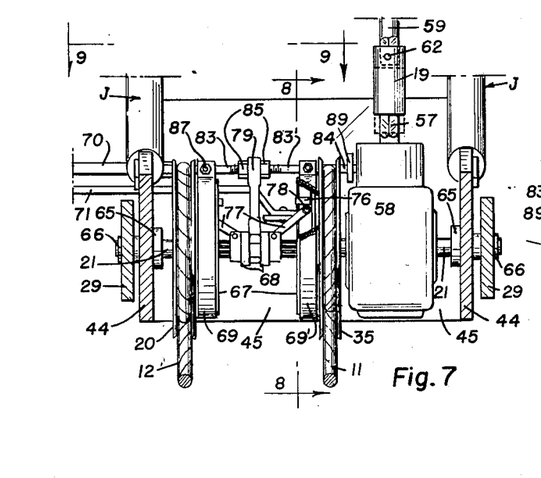
Fig. 7 is an enlarged oblique section taken along lines 7—7 of Figs. 2 and 4, showing particularly the drive mechanism of the loader.

The drive mechanism for operating the cable and pulley systems for the boom and bucket, respectively, is mounted on the platform 45, and includes, as in Fig. 7, the speed reducer 58 which is adapted to rotate the slow speed drive shaft 21 which, for the sake of rigidity, may extend through the side plates 44 of frame F, bearings 65 for shaft 21 being attached to the side plates. Also, the slow speed shaft 21 may extend outwardly to each side of the plates 44, and the arms 29 of boom S pivotally mounted on the overhanging ends, as by collars 66. The drum 20 for cable 12 and the drum 35 for cable 11 are each mounted for free rotation on the shaft 21, each drum conveniently being made by welding a pair of circular plates to a hub to provide a single groove drum on which the cable is wrapped in successive layers. While a single groove drum conserves lateral space, other types of drums may be utilized. A cylindrical brake and clutch flange 67 may be also welded to one side of each of the drums 20 and 35, respectively, the clutches being operated by cones 68 splined on shaft 21, and the brakes respectively including bands 69 and 69', preferably lined on the inside with suitable friction material.

The drive mechanism is controlled by operating levers 70 and 71, the handles of which are disposed at one side of the loading device, as in Fig. 2, at the rear of the dump body D, thereby giving the operator an unimpeded view of the operation of the bucket B in digging into and scooping up the material to be loaded. In the example shown, the operating levers 70 and 71 are so constructed and connected to the clutch and brake mechanisms, that lever 70 may be moved in one direction to first cause the brake for bucket drum 20 to disengage and upon further movement to cause the clutch therefor to disengage; and moved in the opposite direction to first cause the brake for boom drum 35 to disengage and upon further movement to cause the clutch therefor to engage. In neutral position, of course, neither clutch is engaged and both brake bands are normally automatically maintained tight. Thus, by moving lever 70 in one direction, the brake for the bucket, for instance, may be released and the bucket permitted to drop, either rearwardly or forwardly, depending on the position of the bucket prior to brake release. When the lever 70 is moved farther in the same direction, the clutch for drum 20 will be engaged, and the cable 12 wound upon drum 20, whereupon the bucket B will be lifted. Similarly, movement of the lever 70 in the opposite direction will first cause the brake for drum 35 to be released, whereupon the boom S may be lowered by gravity to a desired position. (It may sometimes be desirable to lift the bucket slightly to provide a sufficient weight on the boom to cause it to be lowered by gravity.) When the lever 70 is moved farther in this direction, the clutch for drum 35 will be engaged, and the boom will be raised.

It may sometimes be desired to simultaneously lower the boom and also either lower or raise the bucket, as when "crowding" into a pile of material, as by movement of the bucket from position B-1 of Fig. 1 to position B-4. For this purpose, lever 71 is connected with the brake for boom drum 35, so that the brake may be released by lever 71 while lever 70 is being used to control the bucket. It will be understood, of course, that one lever may control the bucket and the other the boom, and that other lever arrangements may be utilized.

Figure 8:
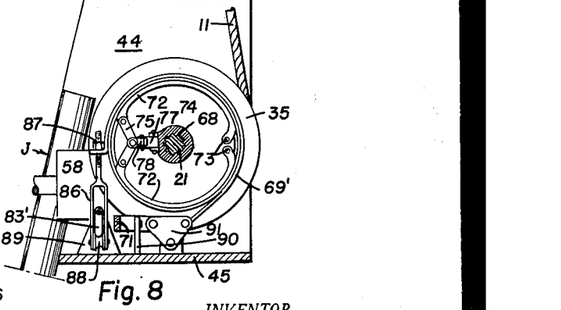
Fig. 8 is a vertical section taken along line 8—8 of Fig. 7.

While various operating connections and various types of clutches and brakes may be utilized, one form found suitable for use is illustrated in Figs. 7 to 10, inclusive. As in Fig. 8, each clutch may include a pair of expanding blocks 72, lined on the outside with suitable friction material and pivotally mounted at their lower ends on pins 73 extending from a back plate 74, which rotates continuously with shaft 21, being attached thereto by a key or the like. The upper ends of the blocks 72 are connected by a toggle joint 75, comprising a pair of pivoted links provided with a lug 76. As in Fig. 10, the corresponding cone 68, splined on shaft 21 and therefore rotating at the same speed as the back plate 74, is provided with a finger 77 having a roller 78 at its outer end. When this cone 68 is moved toward the back plate 74, the roller 78 will move lug 76 outwardly, thus causing the blocks 72 to pivot outwardly and engage the flange, thereby rotating the corresponding drum. The clutch cones 68 are moved on shaft 21 by means of a fork 79, which is movable by lever 70, as in Fig. 9, through a rod 80, which is movable longitudinally by lever 70 through a slotted link 81, which pivots with lever 70 and engages a pin 82 on rod 80. Rod 80 is provided with a cam section 83 for releasing brake band 69, in a manner described below, and its offset end is threaded for attachment to the lower end of fork 79. The offset end of a second rod 84, having a cam section 83' for releasing brake band 69' in a manner also described below, is threaded into the fork 79 from the opposite side, rods 80 and 84 being adjustable and maintained in adjusted position by lock nuts 85, or in any other suitable manner. Each cam section 83 and 83' extends through a fork 86, which, as in Figs. 8 and 9, is connected by an adjusting bolt 87 to the free end of the corresponding brake band, so as to tighten the band on the drum. Each fork 86 is provided with a roller or follower 88, which follows along the underside of cam section 83 or 83', to release the brake, or engages the underside of rod 80 or 84, to the left or right of the respective cam section, to maintain the brake bands 69 and 69' tight. Suitable bearings 89, for rods 80 and 84, are mounted on platform 45.

When the lever 70 is moved upwardly, to cause the rod 80 to move to the right in Fig. 9, for instance, the cam section 83 will permit the follower 88 and corresponding fork 86 for the brake band 69 of drum 20 to move upwardly, thereby releasing the brake. When the lever 70 is moved farther upwardly, to cause the rod 80 to move farther to the right, the clutch for drum 20 will engage. As will be evident, during this time the follower 88 for the brake band 69' of drum 35 will be held by the underside of rod 84, to the left of cam section 83', so that the brake for drum 35 will remain tight. Similarly, when the lever 70 is moved downwardly to move the rod 84 to the left, the brake band 69' for drum 35 will first be released by cam section 83', and upon further movement the clutch for drum 35 will engage. At the same time, the follower 88 for the brake band 69 of drum 20 will remain in engagement with the underside of rod 80, to the right of cam section 83, thereby causing the brake for drum 20 to continue tight.

The brake band 69' for drum 35 is similar to the brake band 69 for drum 20, except that, as in Fig. 8, instead of its "dead" or normally fixed end being anchored to platform 45, it is movable by lever 71, so that the brake band 69' may be released by movement of lever 71. This may be accomplished by pivoted lever 71 on a post 90 and attachment of the end of lever 71 to one corner of a triangular plate 91, pivotally mounted at another corner on platform 45, and attachment of the third corner of plate 91 to the normally fixed end of brake drum 69'. As will be evident, by movement of lever 71, the position of the normally fixed end of brake band 69' may be shifted, so that the brake is released.

It will be understood, of course, that other types of clutches, such as a disc clutch or screw-operated cone clutch, other types of braking mechanism, and variations in the manner in which the levers 70 and 71 are connected to and operate the clutches and brakes, may be utilized. Also, as indicated previously, one lever may operate the clutch and brake for drum 20 and the other lever operate the clutch and brake for drum 35. However, it is normally easier to use merely one lever to operate the bucket and boom alternatively, since little time is usually lost by operation of the second lever.

Figure 11:
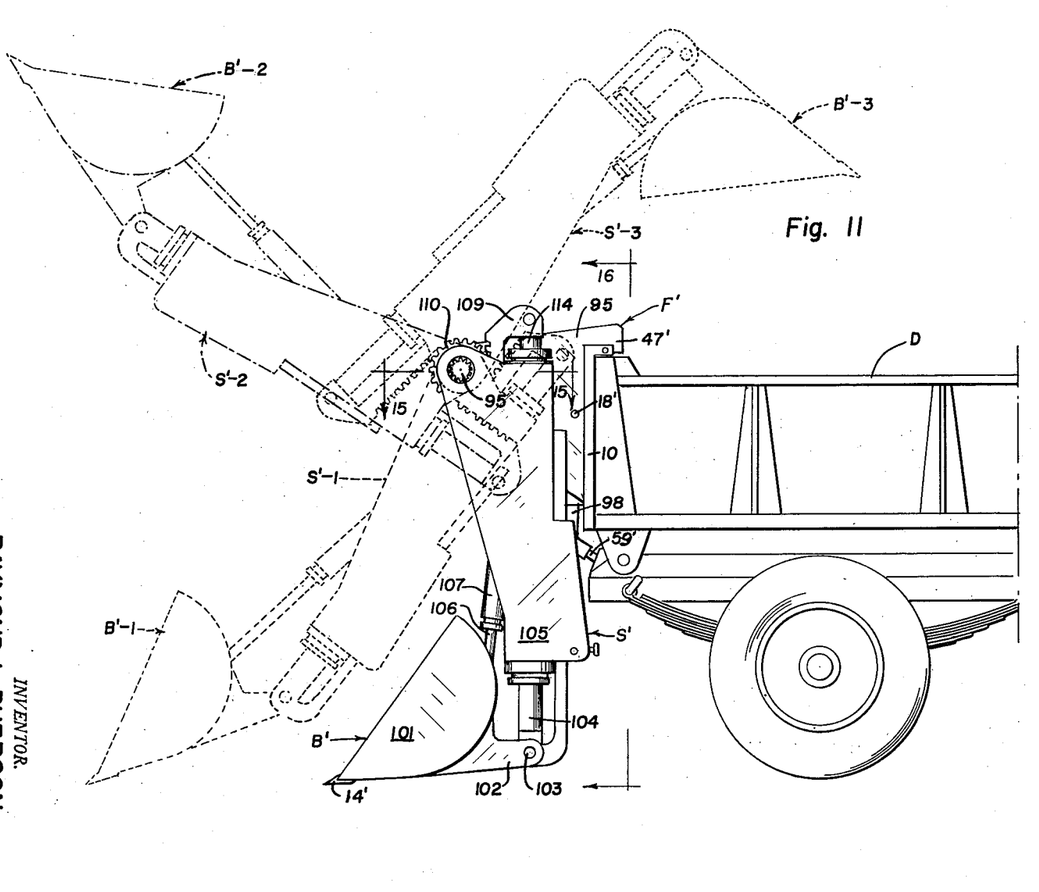
Fig. 11 is a side elevation, similar to Fig. 1, of a loader comprising another embodiment of this invention operated primarily hydraulically, installed on the rear end of a dump truck body, and showing a number of positions illustrative of loading operations.

The hydraulically operated embodiment of this invention, illustrated in Figs. 11–19, inclusive, includes a stationary support or frame F', attached to tail gate 10 of the dump body D; a movable support S', pivotal about a stationary shaft 94, mounted on frame F'; and a bucket B', movable longitudinally with respect to support S' and also pivotally movable with respect thereto. As illustrated in Fig. 11, the bucket B' is adapted to be moved relatively to a pivoted or movable support S', so as to "crowd" or push laterally into a pile of material, as in movement from the full position to the dotted position B'-1 of the bucket. At the same time, of course, the movable support S', which is preferably pivoted at its upper rather than at its lower end, may be swung outwardly to the corresponding position S'-1. The movable support S' and bucket B' may also, of course, be moved to a variety of different positions, useful particularly in filling the bucket B' with the material to be loaded into the dump body D. As soon as the bucket is full, the movable support S' may be swung to an upper rear position S'-2, with the bucket in a corresponding position B'-2, shown in dot-dash lines in Fig. 11. The movable support S' may then be swung forwardly to a forward upper position S'-3, and the bucket moved slightly relatively thereto to the position B'-3, shown in dotted lines in Fig. 11, so that the material in the bucket will be deposited in the dump body D. As will be evident, the material may be dropped gently into the rear end of the dump body, or depending upon the speed at which the movable support S' is moved around through the top of its arc, and also the relative position of the bucket with respect thereto, the material may be thrown forwardly into the dump body, next to the cab.

The second embodiment may be mounted on the tail gate 10 of a truck in a manner similar to that of the first embodiment. Thus, as in Figs. 11, 12 and 14, the side plates 95 of a stationary frame or fixed support F' may be provided at their upper ends with an overhanging lip 47' adapted to fit over the top of the tail gate 10, while a removable locking pin 18' may extend through suitable holes in the side plates 95, and also through holes in angles or brackets 50', which may be welded or otherwise suitably attached to the tail gate 10. Side plates 95 are preferably generally triangular, shaft 94 extending between the rear points thereof with the splined ends 96 thereof fitting into corresponding apertures in plates 95, so as to space the shaft 94 a sufficient distance rearwardly of the tail gate 10, to accommodate the movable support S'. A mounting plate or bracket 97 is attached between the lower ends of the side plates 95, a pump 98 for producing hydraulic pressure for operation of the loading device being mounted thereon adjacent one of the side plates 95, and a hydraulic valve control unit 99 being mounted on the overhanging end of plate 97, as in Fig. 12. The pump 98 is provided with an input or drive shaft 57', as in Fig. 6, which is adapted to be provided with a collar or coupling 19', as in Fig. 14, in turn adapted to be connected to and disconnected from a power shaft 59', in a manner similar to the first embodiment. The loading device of the second embodiment may also be attached to and disconnected from the tail gate 10 in somewhat the same manner as the first embodiment, although, as in Fig. 16, the bucket B' thereof may be extended to set directly on the ground and the movable support S' and frame F' thereof elevated slightly by hydraulic pressure. Thus, by locking certain hydraulic pistons of this loading device in a desired position, in a manner explained later, the device may be set in upright position on the ground.

Figure 12:
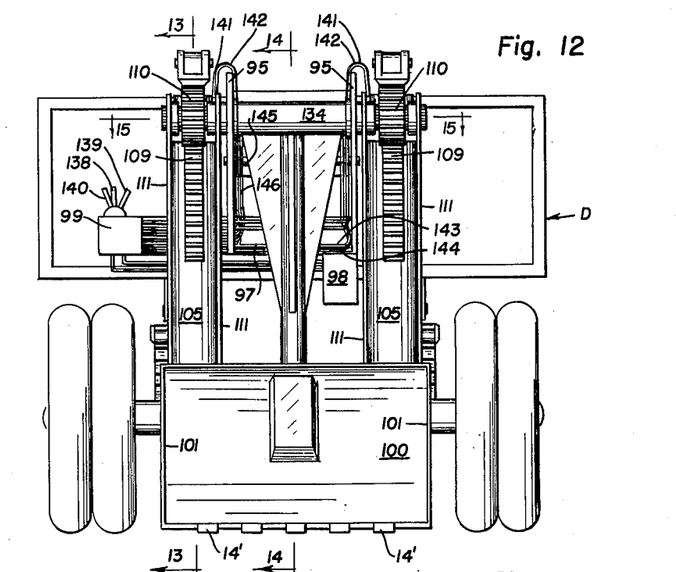
Fig. 12 is a rear view of the loader and truck of Fig. 11, with the loader in a down position.
Figure 13:
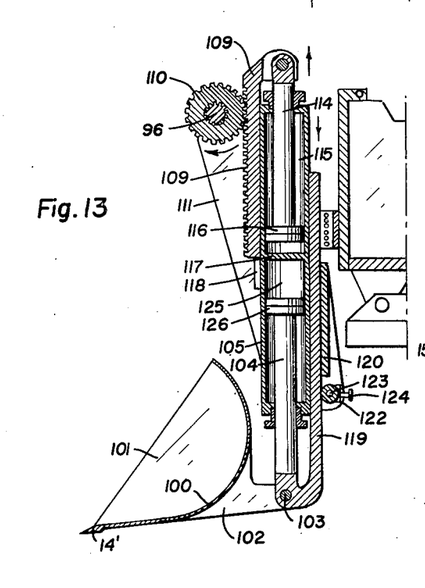
Fig. 13 is a vertical section taken along line 13—13 of Fig. 12.
Figures 14, 16:
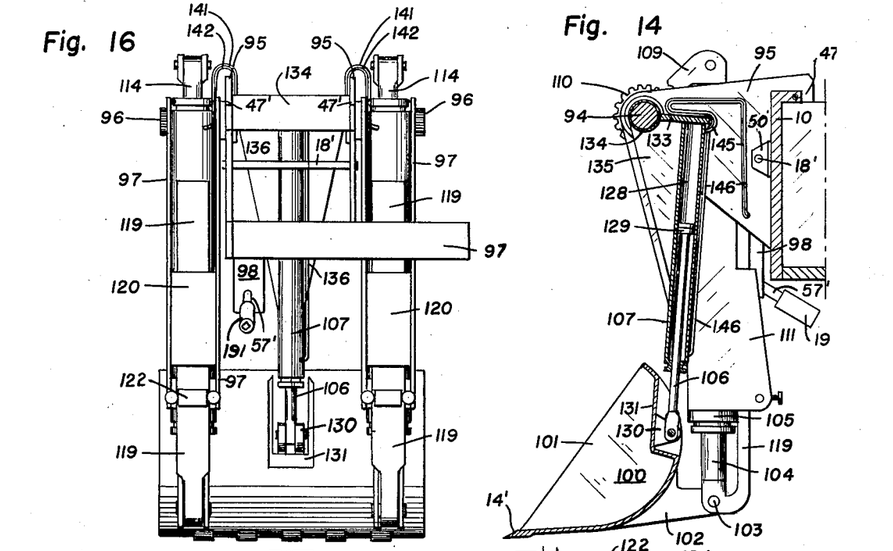
Fig. 14 is a vertical section taken along line 14—14 of Fig. 12.
Fig. 16 is a front elevation of the loader of Fig. 11, detached from the truck.

The bucket B', as in Figs. 12 and 13, may comprise a scoop plate 100 having digging teeth 14' mounted on the forward edge thereof, the front end of the scoop plate being substantially straight and the center and rear being curved, as in Fig. 13, so that by rearward thrust of the bucket, material will be loaded thereinto, and can then be carried up and over and deposited into the dump body D. The ends of the scoop plate 100 may be closed by side plates 101, each having an edge configuration corresponding to the curvature of the scoop plate and attached thereto in a suitable manner, as by welding. The bucket B' is pivotally mounted, by two sets of brackets 102, attached to the rear underside of the scoop plate 100 and pivoted on pins 103, in turn mounted on the lower end of each of a pair of piston rods 104. One piston rod 104 is disposed at each side of the movable support S', and extends from the lower end of a double-ended cylinder 105. Movement of the bucket longitudinally with respect to the movable support S' is produced by the piston rods 104, while pivotal movement of the bucket about pins 103 is obtained through a piston rod 106, which extends from a hydraulic cylinder 107, as in Fig. 14.

The movable support S' is moved to its different positions by the reaction between a pair of racks 109 and cooperating fixed gears 110, held against rotation on stationary shaft 94 by a spline connection or the like, as in Fig. 13. As indicated previously, there are two double-ended hydraulic cylinders 105, extending in parallel relation, and each mounted between a pair of side plates 111, as in Figs. 12 and 15. Side plates 111 are pivoted at their upper ends on stationary shaft 94, as by means of bearing collars 112, which are adapted to rotate about bearing blocks 113, in turn mounted in fixed position on the splined ends 96 of stationary shaft 94, as in Fig. 15.

As in Fig. 13, each rack 109 is attached at its upper end to a piston rod 114, moved inwardly or outwardly in an upper chamber 115 of double-ended cylinder 105 by pressure exerted against one side or the other of a piston 116. When hydraulic pressure is exerted against the lower end of piston 116, i. e. between piston 116 and partition 117 in cylinder 105, as in Fig. 13, the piston rod 114 will be forced out of the upper end of cylinder 105, and each rack 109 will tend to move upwardly with respect to the cylinder 105. However, rack 109 cannot turn fixed gear 110, so the only direction in which the rack can move, with respect to the gear, is around the gear. Thus, when piston rods 114 are moved upwardly, the reaction between the racks 109 and fixed gears 110 causes the support S' to pivot around stationary shaft 94, as indicated by the arrows of Fig. 13 and as will be evident from the various positions of support S' shown in Fig. 11. Similarly, when hydraulic pressure is exerted against the upper end of piston 116, the support S' will be forced to pivot in the opposite direction, i. e. reversely to the arrows of Fig. 13.

Figure 15:
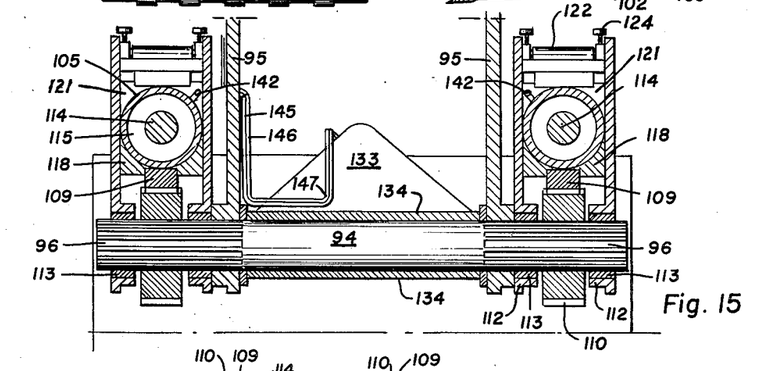
Fig. 15 is an enlarged horizontal section taken along line 15—15 of Fig. 12.

The support S', as in Figs. 13 and 15, may also be provided with guide blocks or slides 118, mounted longitudinally in the wedge shaped spaces between cylinder 105 and the side plates 111, and adapted to maintain the racks 109 in alignment. A slide 119, as in Figs. 13 and 16, may be provided for each lower piston rod 104, being formed integrally therewith or attached thereto, while a guide plate 120 for each slide 119 is mounted between the side plates 111, and guides 121, similar to guides 118, are provided therefor in the opposite wedge shaped corners between cylinder 105 and the side plates 111. In addition, as in Figs. 13, 15 and 16, a roller 122, mounted on a shaft 123 may extend between the lower ends of side plates 111, the rollers 122 being adapted to take the shock load imposed upon slide 119, wear thereon being compensated by adjustment of the position of shaft 123 through adjusting screws 124.

A chamber 125 is formed in the lower end of cylinder 105 beneath partition 117, in which is disposed a piston 126, for moving the piston rod 104 to move the bucket B' longitudinally with respect to movable support S. Cylinder 107 provides a chamber 128 in which hydraulic pressure is exerted against one side or the other of a piston 129, to move piston rod 106 and cause the bucket B' to pivot about pins 103. Piston rod 106 is pivotally attached at its lower end to a bracket 130, which is welded or otherwise suitably secured to the rear side of scoop plate 100, the latter being provided with a box or recessed section 131, to permit the lower end of rod 106 to be pivoted at a point offset from the pins 103 and the path of movement of piston rods 104. In addition, the upper end of cylinder 107 may be offset from stationary shaft 94, as by being attached adjacent the front corner of a triangular plate 133, in turn attached to and extending laterally from a tube or collar 134, which is adapted to rotate about shaft 94, a rear gusset or plate 135 and side gussets 136 preferably being provided for reinforcing purposes. By offsetting the upper end of cylinder 107 with respect to stationary shaft 94, cylinder 107 more readily clears the top of tail gate 19 when the bucket is moved over onto the dump body D, and permits the bucket to be laid down flat, in horizontal position, on the dump body.

Figure 17:
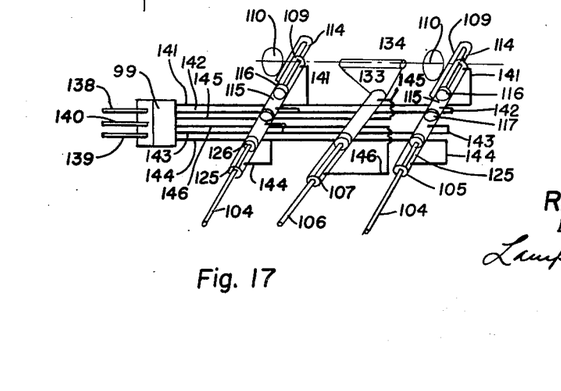
Fig. 17 is an hydraulic diagram of the loader of Fig. 11.

Control of the movement and position of the various pistons in the hydraulic cylinders of this embodiment may be effected in any suitable manner, the system illustrated diagrammatically in Fig. 17 being understood to be only one of several which may be utilized. The hydraulic valve control unit 99 is supplied with fluid under pressure by a conventional hose or pipe connection from pump 98, and a conventional drain connection leads back to the usual fluid reservoir, as in the pump housing. The control unit may be provided with three handles 138, 139 and 140, respectively, each of which, when moved to one position, is adapted to connect the pump pressure line with one of two cylinder lines, and the other cylinder line with the reservoir drain. When moved to the opposite position, the handle causes the opposite cylinder lines to be connected with the pressure and drain lines, respectively. The valves for effecting such control may be conventional, and therefore are not shown, but may be installed within the unit 99. In the neutral position, neither the pressure nor the drain line is connected with either cylinder line, so that the piston under control remains in its position whenever the handle is moved to neutral. Each cylinder line may be partly a pipe and partly a flexible hose, or entirely a flexible hose. The lines controlled by handle 138 include a cylinder line 141, having a branch leading to each of the upper chambers 115 in double-ended cylinders 105, but above the piston 116, and another cylinder line 142, controlled by handle 138, having a branch leading to each of the chambers 115, but below the pistons 116. As will be evident, the handle 138 controls the pivotal movement of the movable support S', since when thrown in one direction it will cause hydraulic fluid under pressure to be supplied through cylinder line 141 to chamber 115 above piston 116, thereby causing support S' to pivot or rotate in a counter-clockwise direction, as viewed in Figs. 11 and 13, i. e. to return to a lower position. When the handle 138 is thrown in the opposite direction, hydraulic fluid under pressure is supplied through cylinder line 142 to chamber 115 below piston 116, thereby causing the piston rod 114 to move outwardly, and each rack 109, through engagement with the fixed gear 110 to force the movable support S' to pivot in a clockwise direction about stationary shaft 94, as viewed in Figs. 11 and 13. The handle 139 is a bucket longitudinal positioning handle, being adapted to control the flow of hydraulic fluid through a cylinder line 143, having branches leading to the chambers 125 but above pistons 126, and a cylinder line 144, having branches leading to each of the chambers 125, but below pistons 126. As will again be evident, movement of handle 139 in one direction causes hydraulic fluid under pressure to be supplied through cylinder line 143 to cause piston rod 104 to be extended from cylinder 105, thereby moving the pivot pins 103 and bucket B' longitudinally, and away from the normally lower end of pivoted support S'. Similarly, movement of handle 139 to an opposite position causes fluid under pressure to be supplied through cylinder line 144 to cause piston rod 104 to be retracted. Handle 138 is a bucket pivot control handle, and the two cylinder lines controlled thereby are a cylinder line 145 leading to chamber 128 in cylinder 107, but above piston 129, and a cylinder line 146 leading to chamber 128 but below piston 129. As will again be evident, movement of handle 140 in one direction will cause hydraulic fluid under pressure to be supplied through cylinder line 145 to cause the bucket B' to pivot about pins 103, outwardly and away from the movable support S', such as from the full position of Fig. 11 to the dotted position B'–1. Similarly, movement of handle 140 in the opposite direction causes hydraulic fluid under pressure to be supplied through cylinder line 146 to cause the piston rod 106 to be retracted and the bucket B' to pivot toward the movable support S', as from the position B'–2 to the position B'–3 of Fig. 11. It will be understood, of course, that whenever hydraulic fluid under pressure is supplied to one end of one of the chambers, the fluid in the opposite end of the chamber is simultaneously removed through the drain line, back to the pump reservoir.

The cylinder lines 141 to 146, inclusive, are conveniently led to the respective cylinders from a position along mounting plate 96 to one of the side plates 95 of frame F', thence up to the top of the side plates 95, as in Fig. 12, to a point adjacent stationary shaft 94. The branches of cylinder lines 141 to 144, inclusive, may conveniently pass upwardly along the outside of side plates 95, and the cylinder lines 145 and 146 may conveniently pass upwardly along the inside of these plates, as in Figs. 14 and 16. From there, the cylinder lines may pass down along the movable supports S', or over to the cylinder 107, respectively. Since the supports S', as well as the cylinder 107, each pivot about the stationary shaft 94, a small loop in each of the lines will provide sufficient flexibility for the pivotal movement of the supports S' and cylinder 107. Thus, as in Figs. 14 and 15, the cylinder lines 145 and 146 may be attached to plate 95 at a point adjacent shaft 94, and then across to the top of triangular plate 133, a loop 147 thereby being formed in each line. From plate 133, line 145 is connected to the upper end of cylinder 107, as in Fig. 14, and line 146 passes down along cylinder 107 to a point adjacent the lower end. The branches of the other cylinder lines may be connected to and/or passed downwardly along the cylinders 105 of support S' in a similar manner. It will be understood, of course, that any other suitable hydraulic control arrangement and position of the hydraulic control lines may be utilized. For instance, the stationary shaft 94 may be hollow, and the hydraulic lines extend therethrough, with swivel connections at the outer ends for connecting to the chambers in double-ended cylinders 105.

Figures 18, 19:
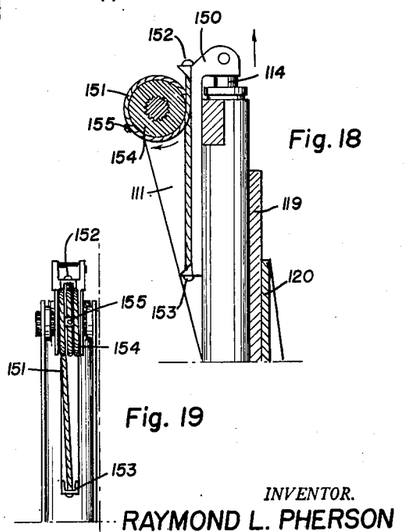
Fig. 18 is a fragmentary vertical section, similar to the upper left portion of Fig. 13, illustrating a slightly different construction of certain parts of the loader of Fig. 11.
Fig. 19 is a fragmentary rear elevation of the construction of Fig. 18.

In lieu of the racks and fixed gears, the pivotal movement of the movable supports S' may be effected through a slide and cable arrangement, as illustrated in Figs. 18 and 19. Thus, a slide 150 may be attached at its upper end to piston rod 114, a cable 151 having one end 152 attached to the normally upper end of slide 150 and the opposite end 153 attached to the normally lower end of slide 150. A stationary, peripherally grooved drum 154 may be mounted in fixed position on stationary shaft 94, as by a key or by a spline connection with the shaft, as shown. Each drum 154 is grooved to receive two or more complete turns of cable 151, the central portion of the cable being fixed to the drum, as by a clip 155. When the piston rod 114 of Fig. 18 is moved axially and outwardly from cylinder 105, the slide 150 will move with the piston rod. However, since the drum 154 is fixed, it cannot turn, and the end 152 of each cable 151 will therefore tend to unwind from the drum 154 while the end 153 of the cable will tend to wind onto the drum. The result is that the movable support S' is caused to pivot or rotate, as in the direction of the arrow of Fig. 18, thereby moving the pivotal support to a desired position. Retraction of piston rod 114 will cause the end 153 of cable 151 to unwind from the drum 154, and the end 152 to rewind thereon, in reverse direction to the arrow of Fig. 18.

From the foregoing, it will be evident that a loading device constructed in accordance with this invention fulfills to a marked degree the requirements and objects hereinbefore set forth. By providing a pivotal or a movable support, and a bucket mounted thereon which may be moved relatively thereto, the path of movement of the bucket is not restricted to an arc defined by the pivotal support, but the bucket may be moved rearwardly and laterally, or even rearwardly and downwardly, to crowd or dig into a pile of material to be loaded into the truck. This is a valuable feature, since a considerably greater amount of material, and a much faster loading rate can be obtained, with a single positioning of the truck, than if the bucket were restricted to movement only in a single arc. Also, it is possible to dig or crowd into material at different elevations, rearwardly of the truck, a further distinct advantage in loading material such as sand, gravel or dirt and the like.

The attachment of the loader to the tail gate or the like of a truck, and provision for relatively quick detachment of the loader, are advantageous since the truck does not have to carry the weight of the loader around with it at all times. A single removable pin, utilized in conjunction with a fixed frame having an overhanging lip adapted to engage the top of the tail gate, combined with a single detachable coupling for the power drive, insures speed in attaching and detaching the loader. While many dump trucks are normally provided with a hydraulic pump for raising the dump bed, provision of a pump on the hydraulically operated loading device is advantageous, since no hydraulic connections need be broken in detaching the device from the truck. Of course, other suitable means for attaching the loader to the truck, whereby it may be quickly detached, may be utilized.

The capacity of the loader of either embodiment of this invention to stand upright, when not in use, and in position to be quickly attached to a tail gate or the like, provides additional advantage. In the embodiment illustrated in Figs. 1 to 9, the hydraulic jacks J are useful not only in maintaining the device in standing position, but also in raising or lowering the frame F, to accommodate tail gates of different heights, as on different trucks or the same truck when empty and when loaded. The embodiment of this invention illustrated in Figs. 11 to 19, inclusive, if desired, can be rested directly on the bucket, the brackets 102, and the lower end of piston rod 104. Or, it may be provided with hydraulic jacks or the like, as the first embodiment. The hydraulic cylinder 107 and its piston rod 106, as will be evident from Fig. 14, can be utilized in maintaining the device in an upright position.

The embodiments of this invention are readily and relatively economically constructed. The embodiment illustrated in Figs. 1 to 10, inclusive, aside from the speed reducer, involves primarily plates which may be readily shaped by flame cutting and then welded together, in addition to the cables and conventionally purchased parts, such as the pulleys and sheaves, shafts, clutches, brake bands and speed reducer. The single wrap drums for the drive cables for the boom and bucket are conveniently made by flame cutting flat plate to form annular plates, and welding the same to conventional hubs. Aside from the replacement of clutch facings and brake bands, due to wear, the parts require little attention, and the tolerances necessary in construction are not restrictive.

The embodiment of this invention illustrated in Figs. 11 to 19, inclusive, which is hydraulically operated, is somewhat lower in height than the cable and pulley operated device, since in the down position, it does not extend proportionately as high as the former. However, the hydraulic device may also be carried with the bucket laid over into or on the dump body.

The hydraulically operated device is relatively easy to construct, since most of the plates may be flame cut and welded together, and the cylinders may all comprise tubing of a suitable size, the piston rods being either solid or hollow rod. The pistons, of course, normally involve rings and some of the parts such as the racks 109 and slides 119, as well as guides 118 and 121, may require special machining, but the surfaces to be finished are not particularly complicated in shape. The hydraulic valve control unit 99 is readily assembled from conventional valves and a housing made of flame cut plate, preferably bolted or otherwise removably secured together, to permit readier access to the interior.

By positioning the controls for the loading device at a point at the rear of the dump body and just to one side of the loading device, the operator has a full and complete view of the operation at all times. Also, the controls are relatively simple, and do not require an undue amount of skill for use. Since both the gear reduction unit of the first embodiment and the hydraulic pump of the second embodiment are preferably driven by a power takeoff from the truck engine, rather than by a separate motor or the like, it is desirable to provide a governor or some sort of automatic accelerating mechanism for the truck engine, so that a heavy load on the bucket, as when digging into a pile of frozen ore, for instance, will not tend to overload and thereby stall the truck engine.

Although two different embodiments of this invention, and certain variations in the construction thereof, have been described in detail, it will be understood that numerous changes may be made. The device need not be fully hydraulic, but may be partly hydraulic and partly other type of mechanism. Also, as indicated previously, other means for attaching the device to the truck may be utilized, and other types of supports or connections between the bucket and a movable support, as well as between the movable support and frame, may be used. Also, certain features or parts may be omitted, or additional features or parts added, without affecting the basic operating characteristics or the effectiveness of the device in use. It will additionally be understood that other embodiments may exist, and that various other changes may be made therein, all without departing from the spirit and scope of this invention.

What is claimed is:

1. A loading device for dump trucks and the like, comprising a bucket; a frame adapted to be attached in stationary position to a tail gate or the like; a removable pin for securing said frame to said tail gate, said tail gate being provided with means adapted to engage said pin; a support pivotally mounted on said frame, said bucket being mounted on said support for relative movement thereto; and means for moving said bucket from a material loading position to a dumping position above said truck body, including means for moving said support relative to said frame and means for moving said bucket relative to said support to vary the path of loading movement of said bucket.

2. A loading device for dump trucks and the like, comprising a bucket; a frame adapted to be attached in stationary position to a tail gate or the like, said frame including an overhanging lip adapted to engage the top of said tail gate; a removable pin for securing said frame to said tail gate, said tail gate being provided with means adapted to engage said pin; a movable support pivotally mounted on said frame; and means for moving said bucket from a material loading position to a dumping position above said truck body, including means for moving said support relative to said frame and means for moving said bucket relative to said support to vary the path of loading movement of said bucket.

3. A loading device for dump trucks and the like, comprising a bucket; a frame having a platform and adapted to be attached in stationary position on a tail gate or the like of said dump truck; a support pivotally mounted on said frame; a bucket pivotally mounted on said support; and means for moving said bucket from a material loading position to a dumping position above said truck body, including drive means mounted on said platform, for moving said support relative to said frame and for moving said bucket relative to said support to vary the path of loading movement of said bucket.

4. A loading device for dump trucks and the like, as defined in claim 3, including a disconnectable drive shaft between said truck and said drive means.

5. A loading device for dump trucks and the like, as defined in claim 3, including controls for said drive means extending to a point at one side of said frame and rearwardly of said tail gate.

6. A loading device for dump trucks and the like, comprising a frame adapted to be attached in stationary position to a tail gate or the like; drive means including a pair of cable drums and control clutches therefor mounted on said frame; a support pivotally mounted on said frame; a bucket pivotally mounted on said support; and cable and pulley means for moving said bucket from a material loading position to a dumping position above said truck body, including a cable adapted to be wound on one said drum for moving said support relative to said frame, and a cable adapted to be wound on the other said drum for moving said bucket relative to said support to vary the path of loading movement of said bucket.

7. A loading device for dump trucks and the like, comprising a frame adapted to be attached in stationary position on a tail gate or the like of the body of said dump truck; a boom pivotally mounted at its lower end on said frame; a bucket mounted on said boom intermediately thereof; means for moving said boom relative to said frame; a cable for moving said bucket relative to said boom; a sheave pivotal about an axis above the axis of pivotal movement of said bucket; spaced shafts on said boom also above said axis; pulleys for said cable mounted on said shafts, whereby said cable engages the pulleys on said first shaft when said bucket is disposed rearwardly of an upper center position and said cable engages the pulleys on said second shaft when said bucket is disposed forwardly of said upper center position; and a swingable support for said pivotal sheave, movable between a rearward position against said first shaft and a forward position against said second shaft in accordance with the position of said bucket.

8. A loading device for dump trucks and the like, comprising a frame adapted to be attached in stationary position on a tail gate or the like of the body of said dump truck; a boom pivotally mounted at its lower end on said frame; a bucket mounted on said boom intermediately thereof; means for moving said boom relative to said frame; a cable for moving said bucket relative to said boom; a drum for said cable mounted on said frame below the pivotal axis of said bucket; a pair of shafts mounted in spaced, parallel relation at the upper end of said boom; a pulley on each said shaft above said drum, said cable passing over one said pulley when said bucket is disposed rearwardly of said boom and over the other said pulley when said bucket is disposed forwardly of said boom; a first sheave on said bucket through which said cable passes from said pulleys; a pair of arms pivoted at their lower ends below said shafts and extending between said shafts; a pivotal sheave mounted between said arms and through which said cable passes from said first sheave, said pivotal sheave being adapted to be moved from a position in which said arms abut against one said shaft when said bucket is rearwardly of said boom to a position in which said arms abut against the other said shaft, when said bucket is forwardly of said boom, as said bucket moves across the longitudinal axis of said boom; a second sheave on said bucket to which said cable passes from said pivotal sheave; and a flanged guide for said cable on each said shaft over which said cable passes from said second bucket sheave, said cable passing over one said guide when said bucket is disposed rearwardly of said boom and over the other said guide when said bucket is disposed forwardly of said boom, the end of said cable being fixed below said guides at a point adjacent the pivotal axis of said bucket.

9. A loading device for dump trucks and the like, comprising a frame adapted to be attached in stationary position to a tail gate or the like; a boom including spaced arms pivotally mounted at their lower ends on said frame; a bucket having spaced arms pivotally mounted at their ends on said boom above the pivotal axis thereof; means for moving said bucket relative to said boom; a cable for moving said boom pivotally on said frame; a drum for said cable mounted on said frame adjacent the pivotal axis of said boom; a first shaft extending between said boom arms adjacent the pivotal axis of said bucket; a second shaft, parallel to said first shaft, mounted on said frame and disposed in spaced horizontal relation thereto when said boom is in an upper position; and a set of pulleys on each of said first and second shafts over which said cable passes alternately, so as to raise and lower said boom when said cable is wound onto and off said drum.

10. A loading device for dump trucks and the like, comprising a frame having a platform at its lower end and adapted to be attached in stationary position on a tail gate or the like of said dump truck; a boom pivotally mounted on said frame; a bucket pivotally mounted on said boom; a cable and pulley means for moving said boom relative to said frame; a cable and pulley means for moving said bucket relative to said boom; a gear reduction unit mounted on said platform; a connection for said reduction unit, disengageable from a power takeoff on said truck; a shaft driven by said gear reduction unit disposed in parallel relation to said platform; a drum for said bucket cable mounted for rotation on said shaft; a drum for said boom cable mounted for rotation on said shaft; a clutch for rotating each said cable drum from said shaft; a band brake for each said drum; a first and second control lever extending from said platform to a point at the side of said loading device, said first control lever being operatively connected with said clutches for engaging one said clutch upon movement a predetermined distance in one direction, and engaging the other said clutch upon movement a predetermined distance in the other direction, neither said clutch being engaged when said first lever is in neutral position; a pair of cam means respectively operatively connecting said lever with one end of each said brake band, so as to release said brake band upon movement of said first control lever a lesser predetermined distance in the direction in which additional movement of said lever will engage the corresponding clutch, and to maintain the position of said brake band when the opposite brake band is released and the opposite clutch engaged; and means operatively connecting the second said lever with the opposite end of the brake band for said boom drum, whereby said boom brake may be released while said bucket drum brake is released or the bucket drum clutch is engaged.

11. A loading device for dump trucks and the like, comprising a frame adapted to be attached in stationary position on a tail gate or the like of said dump truck; a support mounted at its upper end on said frame, for pivotal movement about a horizontal axis, said support including a pair of spaced, longitudinally extending hydraulic cylinders, a piston rod extending from the upper end of each cylinder, and a rack slidable longitudinally with respect to each said cylinder and attached to each said piston rod; a gear in engagement with each said rack and mounted in fixed position on said frame, at the pivotal axis of said support, whereby longitudinal movement of said racks produces pivotal movement of said support; a bucket mounted for relative movement on said support; and means for moving said bucket relative to said support.

12. A loading device for dump trucks and the like, comprising a frame adapted to be attached in stationary position on a tail gate or the like of said dump truck; a support mounted at its upper end on said frame, for pivotal movement about a horizontal axis, said support including a pair of spaced, longitudinally extending hydraulic cylinders, a piston rod extending from the upper end of each cylinder, and a slide movable longitudinally with respect to each said cylinder and attached to each said piston rod; a pair of cable drums, each mounted in fixed position on said frame adjacent one said slide and at the pivotal axis of said support; a pair of cables, each having its ends fixed to the opposite ends of one said slide and having an intermediate portion extending a plurality of times around the corresponding drum, whereby longitudinal movement of said slides produces pivotal movement of said support; a bucket mounted for relative movement on said support; and means for moving said bucket relative to said support.

13. A loading device for dump trucks and the like, comprising a frame adapted to be attached in stationary position on a tail gate or the like of said dump truck; a movable support mounted at its upper end on said frame for pivotal movement about a horizontal axis, said support including a pair of spaced, parallel hydraulic cylinders each having an upper and lower chamber, and a piston rod extending from each said chamber; means actuated by said upper piston rods for producing pivotal movement of said support; and a bucket mounted on the lower end of said lower piston rods.

14. A loading device for dump trucks and the like, comprising a frame adapted to be attached in stationary position to a tail gate or the like of said truck; a stationary, horizontal shaft mounted adjacent the upper end of said frame; a support mounted at its upper end for pivotal movement about said shaft; means movable longitudinally with respect to said support; a bucket pivotally mounted on the lower end of said movable means; a hydraulic cylinder pivotally mounted at its upper end on said shaft, the upper end of said cylinder being offset from said shaft toward said tail gate; and a piston rod extending from the lower end of said cylinder and pivotally connected to said bucket, for producing pivotal movement of said bucket relative to said movable means.

15. A loading device for dump trucks and the like, comprising a frame adapted to be attached in stationary position to a tail gate or the like, said frame including a pair of side plates each having an overhanging lip adapted to engage the top of said tail gate, said side plates being spaced further apart adjacent the lower ends than adjacent the upper ends thereof and said frame including a platform extending between the lower ends of said side plates; a removable pin for securing said frame to said tail gate, said tail gate being provided with means adapted to engage said pin; drive means including a pair of cable drums and clutches therefor mounted on said platform; a slow speed drive shaft for selectively rotating said cable drums through said clutches and extending through said frame side plates; a boom including spaced arms pivotally mounted at their lower ends on said drive shaft outside of said frame side plates; an intermediate shaft extending between said boom side plates, adjacent the upper end of said frame with said boom in an upper pivotal position; a second intermediate shaft, parallel to said first intermediate shaft, mounted on said frame at the upper end thereof, above said overhanging lips; a pair of upper shafts extending in spaced, parallel relation between the upper ends of said boom side plates; a bucket having spaced arms pivotally mounted at their ends on said first intermediate shaft; a cable for moving said bucket relative to said boom, said cable being adapted to be wound on one said drum; a pulley on each said upper shaft, said cable passing over one said pulley when said bucket is disposed rearwardly of said boom and over the other said pulley when said bucket is disposed forwardly of said boom; a first sheave on said bucket through which said cable passes from said pulleys; a pair of arms pivoted at their lower ends on said first intermediate shaft and extending between said upper shafts, each said arm having a rearwardly extending nose; a pivotal sheave mounted between said noses and through which said cable passes from said first sheave, said pivotal sheave being adapted to be moved from a position in which said arms abut against one said upper shaft when said bucket is rearwardly of said boom to a position in which said arms abut against the other said upper shaft, when said bucket is forwardly of said boom, as said bucket moves across the longitudinal axis of said boom; a second sheave on said bucket to which said cable passes from said pivotal sheave; a flanged guide for said cable on each said upper shaft and over which said cable passes from said second bucket sheave, said cable passing over one said guide when said bucket is disposed rearwardly of said boom and over the other said guide when said bucket is disposed forwardly of said boom, the end of said cable being fixed to said first intermediate shaft; a cable for said boom, adapted to be wound on the other of said drums, the opposite end of said cable being fixed to said frame; and a series of pulleys on each said intermediate shaft, said cable passing over first and second intermediate shaft pulleys alternately.

16. A loading device for dump trucks and the like, comprising a frame adapted to be attached in stationary position to a tail gate or the like, said frame including a pair of side plates each having an overhanging lip adapted to engage the top of said tail gate, said frame having a mounting plate extending between the lower ends of said side plates and to one side of one said side plate; an hydraulic pump mounted on said mounting plate; hydraulic control means mounted on said mounting plate on the side extending portion thereof; a stationary, horizontal shaft mounted adjacent the upper end of said frame; a support including two sets of side plates mounted at their upper ends for pivotal movement about said shaft; a pair of spaced parallel hydraulic cylinders each disposed between a pair of side plates and each having an upper and lower chamber, and a piston rod extending from each said chamber; a slidable guide attached to each said lower piston rod and extending upwardly alongside the corresponding cylinder; a guide plate for each said guide; an adjustable roller adjacent the lower end of each cylinder for engaging said guide; a bucket pivotally mounted on the lower ends of said lower piston rods; a hydraulic cylinder pivotally mounted at its upper end on said shaft, the upper end of said cylinder being offset from said shaft toward said tail gate; a piston rod extending from the lower end of said cylinder and pivotally connected to said bucket, for producing pivotal movement of said bucket relative to said lower piston rods; a rack slidable longitudinally with respect to each said cylinder and attached to each said upper piston rod; and a gear in engagement with each said rack and mounted in fixed position on said shaft, whereby longitudinal movement of said racks produces pivotal movement of said support.

17. A loading device for dump trucks and the like, comprising a frame adapted to be removably attached in stationary position on a tail gate or the like of the body of said dump truck; a movable support pivotally mounted on said frame; a bucket mounted on said support for pivotal movement relative thereto; and means for moving said bucket from a material loading position to a dumping position above said truck body, including means for moving said support relative to said frame and cable and pulley means for independently moving said bucket relative to said support to vary the path of loading movement of said bucket, said cable and pulley means including a rotatable sheave pivotal about an axis transverse to the axis of rotation of said sheave, said pivotal axis being parallel to but above the aixs of pivotal movement of said bucket.

18. A loading device for dump trucks and the like, as defined in claim 17, including means supporting said sheave for restricted movement of the pivotal axis thereof between positions to front and rear of the normal vertical center line of movement of said bucket.

19. A loading device for dump trucks and the like, as defined in claim 2, wherein said movable support is pivotally mounted at its upper end on said frame; said bucket moving means includes slide means movable longitudinally of said support; and said bucket is pivotally mounted at the lower end of said slide means.

RAYMOND L. PHERSON.

References Cited in the file of this patent

UNITED STATES PATENTS

| Number | Name | Date |
| --- | --- | --- |
| 1,857,302 | Hawkins | May 10, 1932 |
| 2,004,022 | Twik | June 4, 1935 |
| 2,119,139 | Owen et al. | May 31, 1938 |
| 2,321,630 | Shippee | June 15, 1943 |
| 2,344,796 | White | Mar. 21, 1944 |
| 2,441,591 | Owen | May 18, 1948 |
| 2,480,959 | Presnell | Sept. 6, 1949 |